United States Patent [19]
McBride

[11] Patent Number: 5,926,315
[45] Date of Patent: Jul. 20, 1999

[54] SHELF LABEL READER

[76] Inventor: Cindy McBride, 1077 E. Canyon Creek Dr., Bountiful, Utah 84010

[21] Appl. No.: 08/901,390

[22] Filed: Jul. 28, 1997

Related U.S. Application Data

[60] Provisional application No. 60/023,674, Aug. 16, 1996.

[51] Int. Cl.$^6$ ................................................. G02B 5/126
[52] U.S. Cl. ........................... 359/534; 359/819; 235/383
[58] Field of Search ..................................... 359/819, 534

[56] References Cited

U.S. PATENT DOCUMENTS

| | | | |
|---|---|---|---|
| 4,923,282 | 5/1990 | Spitzberg | 359/819 |
| 4,958,913 | 9/1990 | Schaffer | 359/819 |
| 4,969,723 | 11/1990 | Kato et al. | 359/819 |
| 5,491,589 | 2/1996 | Haymond | 359/819 |

OTHER PUBLICATIONS

"Bartell Drug Debuts Magnification System," *Chain Store Age Executive*, p. 62, published Feb. 1994, New York, NY.

*Primary Examiner*—Harold I. Pitts
*Attorney, Agent, or Firm*—Trask, Britt & Rossa

[57] ABSTRACT

A clear, plexiglass label reader has a connector for securement to a price slot of a retail shelf. The label reader has an extension with a cross member unitarily formed at its outer end. The cross member extends outwardly from the extension and has a magnifying member.

15 Claims, 4 Drawing Sheets

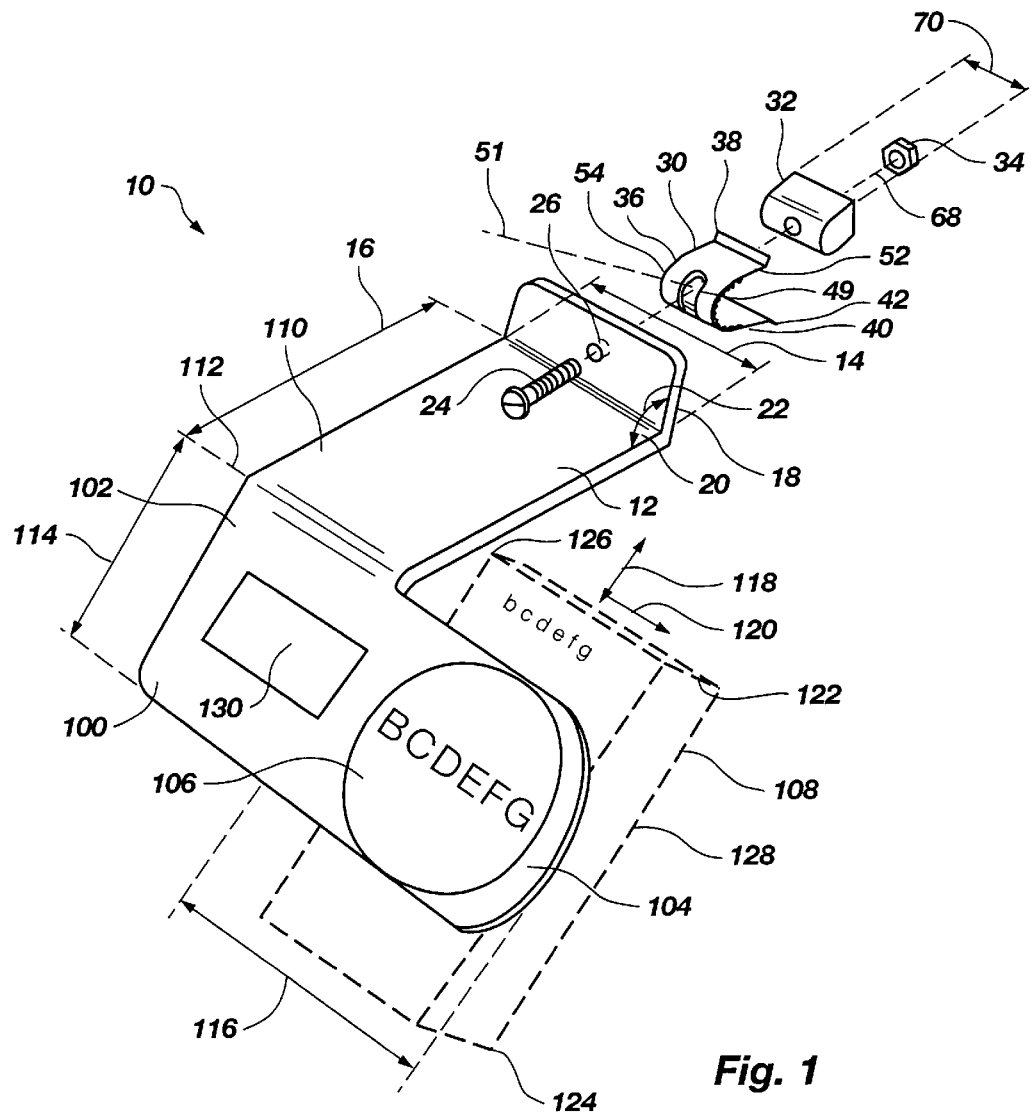
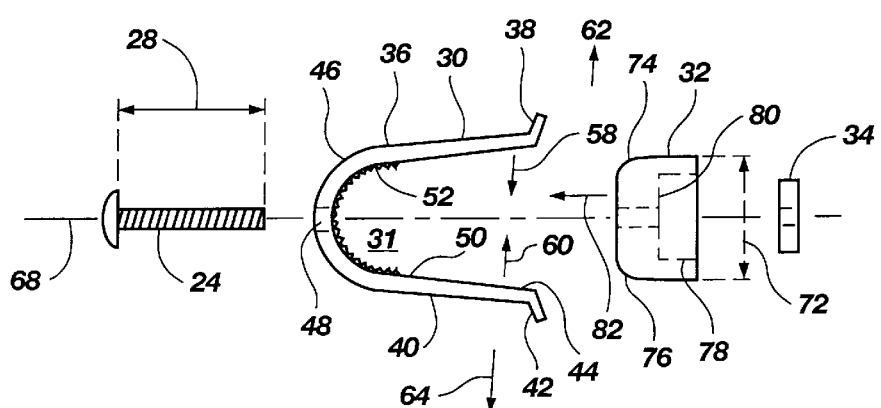

5,926,315

SHELF LABEL READER

This application claims benefit of U.S. Provisional application No. 60/023,674, filed Aug. 16, 1996.

BACKGROUND OF THE INVENTION

1. Field of the Invention

This invention relates to point-of-purchase structures and, more particularly, to a device which may be associated with a store shelf magnifying the printing on package labels of products available on the store shelf.

2. State of the Art

Many consumer products available for consumer selection on shelves in, for example, grocery stores have printing that may be too small for selected customers to easily read. This is particularly poignant for "off-the-shelf" medications which in many cases appear in boxes or containers of relatively small size and in turn have very small print on the associated box or label. Even those with normal vision have difficulty reading some of the labels because the print is sometimes too small.

In some cases, shoppers take magnifying glasses to read important product label information before making a selection. In other cases, shoppers will take the potential purchase to an attendant and ask the attendant to read the label for them.

A magnification system has been suggested for positioning in the vicinity of the products to be purchased. A trade magazine published in February, 1994, and identified as the *Executive Chain Store Age,* at page 62 identified a magnification system offered by Bartell Drug which included structure to attach to a shelf. The structure positioned a magnification lens at the distal end of the structure which extended upwardly therefrom. The magnification lens was sized in width the same as the width of the structure extending away from the shelf.

An improved magnification system which allows a user to more easily read the label on tall and wide packages with ease is not known.

SUMMARY

A label reader has an extension member. Securing means is mechanically associated with the extension member for securing the extension member to a structure. Examples of a structure include a multi-shelf retail shelving unit for individual products for selection by a consumer.

Preferably, a cross member is secured to the extension member and has an outward portion spaced transversely away from the extension member. The magnifying member is attached to or formed as a part of the cross member.

The outward portion of the cross member is preferably transparent. Even more desirably, the extension member and the cross member are preferably unitarily formed of a transparent, plastic-like material. The securing means preferably includes means for attaching the extension member to a retail shelving unit.

The securing means is more preferably a connector configured to secure the extension member to the price slot of the shelf of a retail shelving unit.

BRIEF DESCRIPTION OF THE DRAWINGS

In the drawings which illustrate what is presently regarded as the best mode for carrying out the invention:

FIG. 1 is a perspective, exploded view of a label reading device of the present invention;

FIG. 2 is an exploded side view of the securing means of the label reader of FIG. 1;

DETAILED DESCRIPTION OF THE ILLUSTRATED EMBODIMENT

Figure 4:
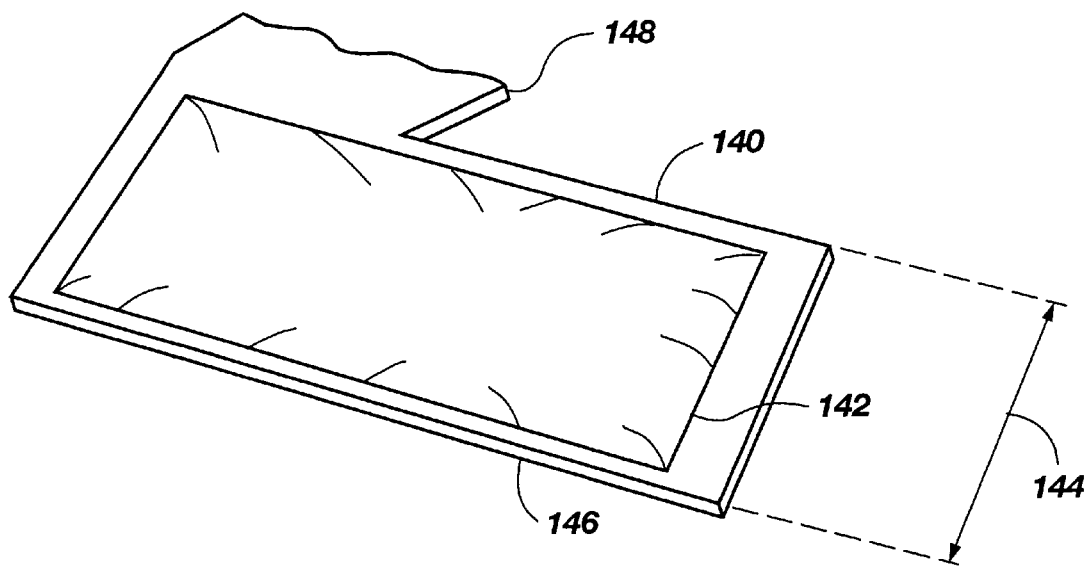
FIG. 4 is a partial perspective view of an alternate label reader of the invention.

The label reader 10 shown in FIG. 1 has an extension 12 having a width 14 and a length 16.

Securing means for securing the extension member 12 to a structure is mechanically associated with the extension member 12. As shown in FIG. 1, the securing means includes a flange 18 unitarily formed to extend away from the proximal end 20 of the extension member 12 at an angle 22, which is here an obtuse angle from about 100° to about 130° and preferably about 110°.

The securing means illustrated in FIGS. 1 and 2 includes a bolt 24 which extends snugly through an aperture 26 formed in the flange 18. The bolt 24 is sized in length 28 to extend through a spread clamp 30 and spreader 32 for threaded connection to nut 34.

As better seen in FIG. 2, the spread clamp 30 has an upper leg 36 with a toe 38 formed to extend transversely away therefrom. The spread clamp 30 also has a lower leg 40 with a toe 42 extending away from the distal end 44 of the lower leg 40. The upper leg 36 and the lower leg 40 are interconnected by a central section 46 through which aperture 48 is formed to receive the bolt 24. In FIG. 1, the aperture 49 is a slot so that the flange 18 may be secured to the spread clamp 30 on axis 68 or on a plurality of other axes such as axis 51.

The interior surface 50 of the center section 46 has a plurality of small teeth 52 formed to extend transversely from between the left edge 54 and the right edge 56 of the spread clamp 30.

The spread clamp 30 is preferably formed of a plastic-like material so that the upper leg 36 and the lower leg 40 may be deflected toward each other 58 and 60. Of course, the upper leg 36 and lower leg 40 may also be similarly deflected away 62 and 64 from each other and, more particularly, away from the central axis 68 illustrated in FIGS. 1 and 2.

A spreader 32 is sized to be substantially the same width 70 as the spread clamp 30 and is sized in height 72 for positioning in the interior 31 of the spread clamp 30. More particularly, the spreader 32 has an upper rounded corner 74 and a lower rounded corner 76 which contact the teeth 52 formed along the interior surface 50 of the spread clamp 30. With the bolt 24 threadedly engaging the nut 34, the nut 34 is drawn into the cavity 78 which is sized to receive the nut 34 in the spreader 32. As the nut 34 contacts the interior surface 80 of the cavity 78, the rounded corners 76 and 74 contact the teeth 52, thereby retaining the legs 36 and 40 in a non-deflectable configuration. Upon operation of the bolt 24 relative to the nut 34, the nut and bolt urge the spreader 32 toward 82 the interior surface 50 and more particularly teeth 52, thereby urging the upper leg 36 outwardly 62 and the lower leg 40 outwardly 64.

Figure 3:
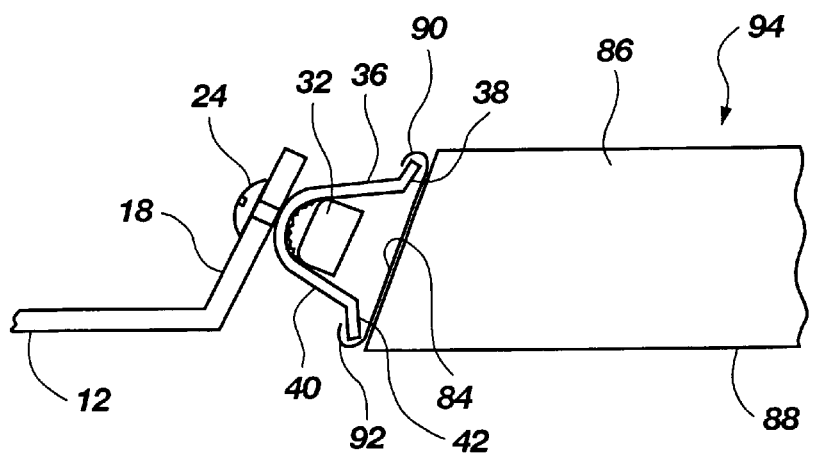
FIG. 3 is a partial cross-section view of a label reader of the present invention and a portion of a shelf of a shelving unit.

As better illustrated in FIG. 3, the toe 38 and the toe 42 are each sized and configured to be inserted within the price track 84 positioned at the outer edge 86 of a shelf 88 of a retail shelving unit. That is, the price track 84 typically has an upper ledge 90 and a lower ledge 92 which are arcuate and into which pricing and product identification information can be positioned for a product that is placed on the support surface of the shelf 88. The toes 42 and 38 are sized to be inserted within the upper ledge 90 and lower ledge 92.

In order to insert the toe 38 and toe 42, the upper leg 36 and lower leg 40 are deflected toward 58 and 60 each other. Upon placement proximate the upper ledge 90 and lower ledge 92, the upper leg 36 and lower leg 40 are released or no longer deflected whereby the toe 38 and the toe 42 insert into the upper ledge 90 and the lower ledge 92.

Upon operation of the bolt 24 (e.g., by a screwdriver), the bolt 24 draws the nut 34 into the spreader 32, in turn, snugly securing the flange 18 to the spread clamp 30 and also urging the upper leg 36 and the lower leg 40 outwardly and more snugly into the upper ledge 90 and lower ledge 92.

Returning to FIG. 1, it can be seen that the extension member extends outwardly a length 16 which is selected to space the cross member 100 away from the shelf, such as shelf 88, a distance selected so the user may be able to easily position a product for label reading as hereinafter discussed. Although any convenient length may be selected, it is presently contemplated that a preferred length 16 would be from about 2½ inches to about 4½ inches in the configuration of FIG. 1. In order to provide transverse stability, the extension 12 is preferably sized in width 14 from about 1½ inches to about 3½, and more preferably about 2½ inches.

In FIG. 1, the cross member 100 is secured to the extension member 12 with an outward portion that extends transversely as illustrated. That is, the cross member 100 has a base portion 102 which is connected to the extension member 12 and an outward portion 104 which is transversely spaced away from the extension member 12. A magnifying member 106 is positioned at the outward end 104 of the extension member 100 for magnifying objects that are placed thereunder, such as box 108.

As shown in FIG. 1, the cross member 100 is secured to the outward or distal end 110 of the extension member 12 and extends downwardly therefrom at an angle 112, which may be from about 110° to about 160°, and preferably is about 140°. The angle 112 is selected to facilitate ease in reading of the writing on a box such as box 108. The cross member 100 extends downwardly a width 114 sized to easily support the magnifying member 106. The cross member 100 has an outward portion 104 which extends a distance 116 away from the extension member 12. The distance 116 is selected to accommodate a box or product so that it may be moved upwardly (or downwardly) 118 and laterally or transversely 120 as the user reads the label.

The magnifying member 106 is positioned at the outward portion 104 so that a user may position a product underneath the magnifying member 106 and move any desired portion of the product, such as box 108, relative to the magnifying member to facilitate reading all of the label from the top 122 of the box to the bottom of the box 124.

Similarly, the user is able to move the product to read printed material between the left side 126 and right side 128. That is, the distance 116 is selected for the shelving area in which the label reader 10 is to be positioned to accommodate products of different sizes that appear on the shelf proximate the label reader.

To facilitate construction, the extension member 12 is preferably formed out of a thin, totally transparent plexiglass-type material or other similarly transparent plastic-like material. The flange 18 is unitarily formed therewith to extend as previously discussed. The cross member 100 is also unitarily formed with the extension member 12 so that the flange, extension member 12 and cross member 100 are all unitarily formed. The magnifying member 106 may be separately formed from the cross member 100 and may be positioned on the transparent cross member 100 by adhesion using any conveniently acceptable transparent adhesive. Alternatively, the magnifying member 106 may be integrally formed with the cross member 100 as a unitary structure by such means as injection molding. Instructions 130 for the user on how to use the label reader may be secured to the cross member 100 using sufficiently large print so that a user may easily understand the function, purpose and operation of the label reader. Alternatively or in addition, product advertising may be placed on the cross member 100.

The magnifying member 106 as here shown is round with a desired magnification of approximately 5 times normal. Other magnifications may be used as desired, depending upon the nature of the size of the small print in the products in the vicinity of the label reader on the shelves such as shelf 88 of a retail display structure.

FIG. 4 shows an alternate label reader of the present invention in perspective with the cross member 140 having a rectilinear magnifying member 142 positioned in relationship thereto. The rectilinear member 142 facilitates reading labels on long narrow boxes such as, for example, a toothpaste box. At the same time, boxes with vertical writing of a length more than the width 144 of the cross member 140 may be easily moved relative to the magnifying member 142 in the distal portion 146 of the cross member 140. In FIG. 4, the extension 148 is shown unitarily formed with the cross member 140.

Figure 5:
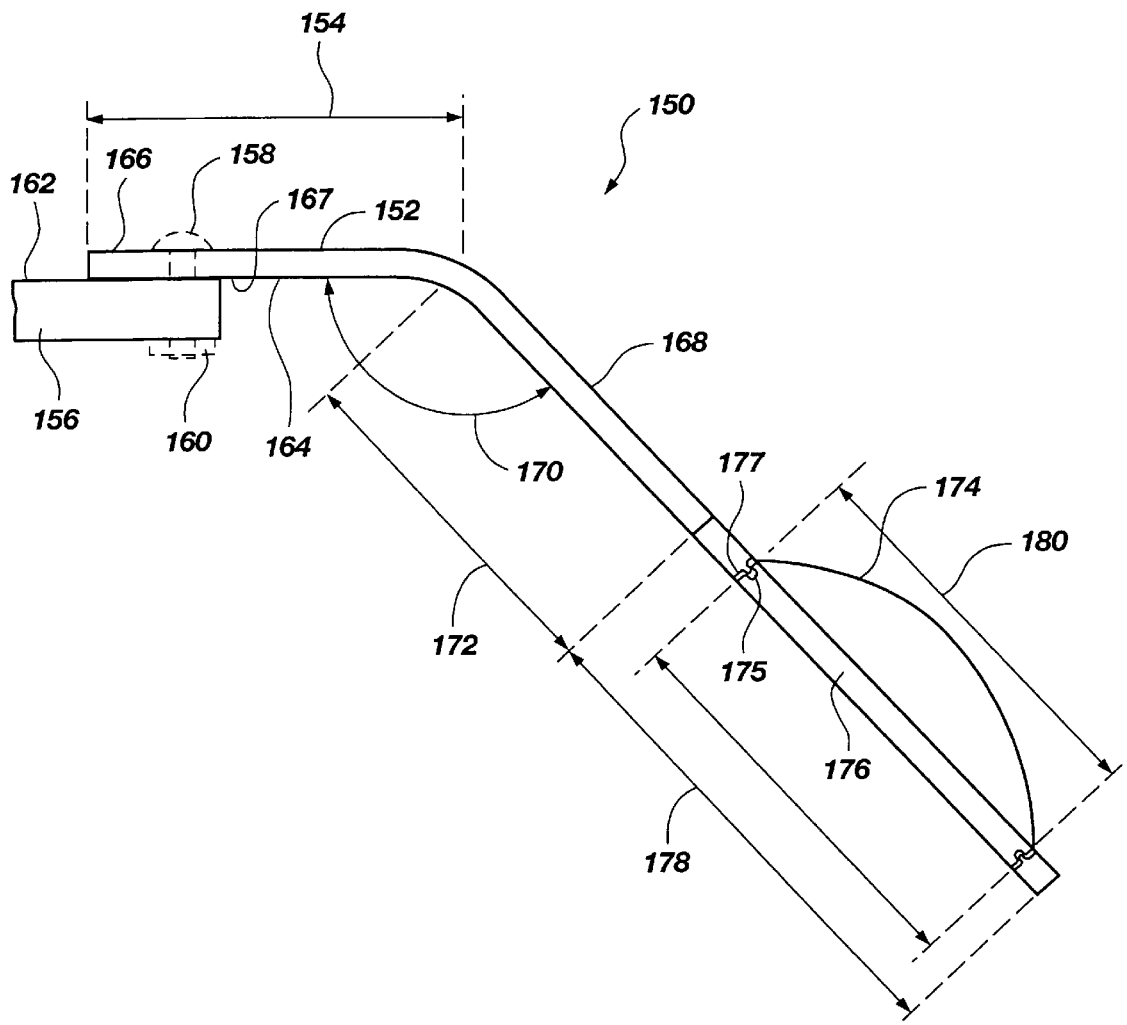
FIG. 5 is a side view of an alternate label reader of the invention.

Turning now to FIG. 5, an alternate arrangement of the magnifying member is shown. The label reader 150 of FIG. 5 has an extension member 152 having a length 154 of about 2¾ inches but which may vary from about 2 inches to about 5 inches as desired.

Securing means are provided to secure the extension member 152 to the shelf 156 of a shelving unit. As here shown, the securing means may include a bolt 158 with an associated nut 160. Appropriate apertures are drilled through the extension member 152 and the corresponding shelf 156 to provide for the connection. Alternately, various adhesives may be provided to provide for a secure attachment between the upper surface 162 of the shelf 156 and the lower surface 164 of the extension member 152. Indeed, certain high tensile adhesives may permit gluing of surface 162 to the undersurface 167 of the extension member 152.

The width 154 of the extension member 152 is preferably selected so that a greater portion of the extension member would extend inwardly on the shelf 156 to provide for increased contact between the shelf 156 and the extension member 152 to in turn increase the strength of attachment if an adhesive is used and also to provide an upper surface 166 upon which product may be positioned in order to provide a downward force to hold the label reader 150 more securely in position.

It may be noted that the extension member 152 has a distal portion 168 extending downwardly at an angle 170 comparable to angle 112 in FIG. 1. The distal portion 168 extends downwardly a distance 172 to provide additional space for positioning packages for reading by the magnifying member 174. The magnifying member 174 is positioned at the outward portion 182 of the cross member 176, which is unitarily formed with the base portion 183 to extend away from the distal end 168 of the extension member 152.

The cross member 176 has a width 178 selected to position a magnifying member 174 of a desired diameter 180 or desired height and width for rectilinear-shaped magnifying members 174. The diameter 180 or the height and width of the magnifying member 174 as well as the magnification are selected relative to the retail products positioned on the shelves such as shelf 156 in the immediate vicinity of the label reader 150. That is, small or very fine print requires greater magnification. Large boxes (e.g., family-size laundry soap) mean a larger width 178 and length 184.

More specifically, label readers may have magnifying members such as member 174 of magnifications ranging from as low as 1.5 times to as large as 9 or 10 times, depending upon the products that are positioned on the adjoining or nearby shelves such as shelf 156. The total distances such as distance 172 and 178 are similarly selected based on the size of the products that are positioned on the shelf. Aspirin bottles and cold tablet bottles yield certain desired dimensions in which the total length 172 plus 178 is about 6 inches.

The outward portion 182 of the cross member 176 extends to the right of the extension member 152. That is, most people are right-handed and will find that an outward portion 182 extending to the right is preferred because the package will be held in the reader's right hand. An outward portion may be provided extending to the left of the extension member 152 for those who are left-handed and find it easier to grasp a box or product for which the label is to be read in the left hand.

Figure 6:
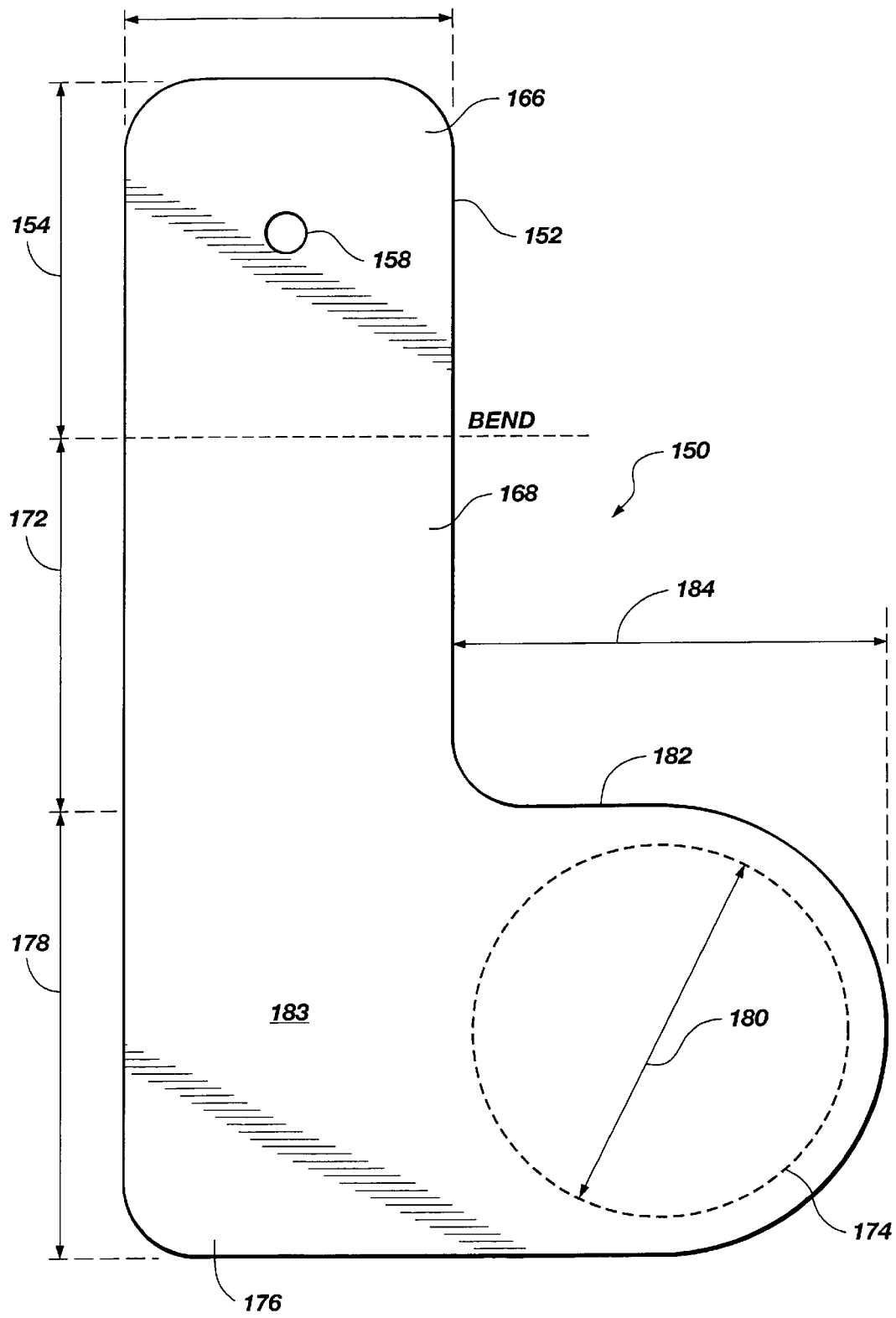
FIG. 6 is a top view of the label reader of FIG. 5.

Although a label reader may be provided having a distal portion extending both to the right such as that shown in FIG. 6 as well as to the left (which is not shown) of the extension member 152, such is generally not provided to minimize cost and also because the amount of cantilevered weight will increase, requiring a stronger connection between the shelf such as shelf 156 and the label reader.

It should be understood that the embodiments herein described are illustrative of the principles of the invention. Reference herein to the details of the illustrated embodiment is not intended to limit the scope of the claims which themselves recite those features regarded as essential to the invention.

What is claimed is:

1. A label reader comprising:
an extension member sized to extend away from a structure;
securing means mechanically associated with the extension member for rigidly securing said extension member to the structure;
a cross member secured to said extension member to extend downwardly and sideways transversely away from said extension member, said cross member being shaped to be spaced from said structure a distance selected for positioning objects with labels for reading by a user between said cross member and said structure; and
a magnifying member positioned on said cross member and spaced away from said extension member for magnifying the objects positioned between said cross member and said structure.

2. The label reader of claim 1, wherein said cross member has a base portion secured to said extension member and an outward portion spaced transversely away from said extension member; and wherein said magnifying member is positioned on said outward portion.

3. The label reader of claim 2, wherein said outward portion is transparent.

4. The label reader of claim 3, wherein said extension member and said cross member are unitarily formed of a transparent, plastic-like material.

5. The label reader of claim 4, wherein said securing means includes means for attaching the extension member to a retail shelving unit.

6. The label reader of claim 4, wherein said securing means is a connector configured to be secured to the price slot of a self of a retail shelving unit.

7. The label reader of claim 2 wherein said base portion is secured to said extension member to extend away therefrom at an angle relative to said extension member selected to facilitate reading by the user.

8. The label reader of claim 7 wherein said cross member angles downwardly from said extension member and said angle is selected to be from about 110 degrees to about 160 degrees measured from the extension member to said base portion.

9. The label reader of claim 2 wherein said base of said cross member includes means associated therewith configured for receiving and retaining printed material.

10. A label reader comprising:
an extension member sized to extend away from a shelf of a retail shelving structure, said shelf being positioned to be reachable by the arms of an upright adult user positioned proximate thereto and said shelf being configured to receive and support objects having labels for reading by the adult user;
securing means mechanically associated with the extension member for rigidly securing said extension member to the shelf;
a cross member rigidly secured to said extension member to extend downwardly and sideways transversely to said extension member, said cross member being configured to be spaced from said shelf a distance selected for positioning objects with labels for reading by a user between said cross member and said shelf; and
a magnifying member positioned on said cross member and spaced away from said extension member for magnifying the objects positioned on the shelf between said cross member and said shelf.

11. The label reader of claim 10 wherein said cross member has a base portion secured to said extension member and an outward portion spaced transversely away from said extension member, wherein said magnifying member is positioned on said outward portion and wherein said said base portion of said cross member is sized to receive printed material for reading by the user.

12. The label reader of claim 10 wherein said magnifying member is sized in area to present the adult user with a readable image of the label.

13. The label reader of claim 10 wherein said outward portion of said cross member extends to the right away from said extension member when facing the extension member attached to the shelf.

14. The label reader of claim 13 wherein the cross member and the extension member are unitarily formed.

15. The label reader of claim 14 wherein the objects are non prescription medicine boxes with printed label portions.

* * * * *